United States Patent Office 2,703,792
Patented Mar. 8, 1955

2,703,792

REVERSIBLE OXIDIZABLE AND REDUCIBLE PHENOLIC RESINS

Edward L. Kropa, Old Greenwich, and Richard P. Welcher, Greenwich, Conn., assignors to American Cyanamid Company, New York, N. Y., a corporation of Maine No Drawing. Application February 25, 1950, Serial No. 146,396

11 Claims. (Cl. 260—54)

This invention relates to resins which may be reversibly oxidized and reduced.

In the past both soluble and insoluble resins have been utilized for the exchange of ions in, or the removal of ions from, the media containing them. Thus, cation active resins such as nuclearly sulfonated phenol-formaldehyde condensation products, condensation products of phenol, formaldehyde and water-soluble salts of sulfurous acid, sulfonated copolymers of styrene and divinyl benzene, etc., have been used to remove cations from, or exchange cations in, solutions. By the same token, anion active resins such as epichlorohydrin-polyamine condensation products, aldehyde condensation products of guanido compounds, insolubilized by urea- and/or melamine-formaldehyde resins, etc., have been used to remove anions from, or exchange anions in, solutions. In each of these cases, of course, ions are involved in the reactions which take place.

It is an object of the present invention to produce insoluble resins which will exchange electrons.

It is a further object of the present invention to produce a fusible resin which will exchange electrons rather than ions with a contiguous phase in which it is insoluble.

Another object of the present invention is the production of an infusible resin which will exchange electrons rather than ions with a contiguous phase in which it is insoluble.

It is another object of the present invention to provide insoluble resins which are capable of reversibly undergoing oxidation and reduction.

Another object of the present invention is to provide a reducing agent which may be simply removed from the material being reduced by filtration when it is desired to terminate the reduction or when the reduction is complete.

Still another object of the present invention is to provide an oxidizing agent which may be simply removed from the material being oxidized by filtration, decantation, or the like, when it is desired to terminate the oxidation or when the oxidation is complete.

A further object of the present invention is the provision of an insoluble resin which by virtue of its reversible oxidation-reduction characteristics is useful as an antioxidant.

Still another object of the present invention is the provision of an insoluble resin which is useful as a polymerization inhibitor for vinyl-type monomeric compounds.

Another object of the present invention is the production of compositions containing vinyl-type monomers which are stabilized against polymerization.

The above and other objects may be attained by condensing hydroquinone or other aldehyde-reactive organic redox compound, phenol or other aldehyde-reactive crosslinking compound and formaldehyde or other aldehyde to produce a fusible or infusible resin which is insoluble in the medium in which it is to be used.

The invention will be described in greater detail in conjunction with the following specific examples in which proportions are given in parts by weight. The examples are merely illustrative, and it is not intended that the scope of the invention be restricted to the details therein set forth.

PREPARATION OF RESINS

*Example 1*

220 parts (2.0 mols) hydroquinone
19 parts (0.2 mol) phenol
324 parts (4.0 mols) formaldehyde, 37% aqueous
3 parts sodium hydroxide in 50 parts water The above reactants are charged, in the order listed, to a suitable vessel equipped with means for agitation, means for reflux and means for indicating temperature. The reaction mixture is heated, whereupon it becomes entirely liquid at 50–55° C. and refluxes at about 97° C. Refluxing is continued for about 30 minutes until the contents of the vessel gel or become very viscous, the total heating time being 140 minutes. The reaction product is then transferred to a tray, cured in a forced-draft oven at 100° C. for about 16 hours, cooled and ground to pass a 20 mesh screen. The ground resin is separated into three fractions, a —20+40 mesh, a —40+60 mesh and a —60 mesh fraction.

*Example 2*

220 parts (2.0 mols) hydroquinone
19 parts (0.2 mol) phenol
324 parts (4.0 mols) formaldehyde, 37% aqueous
0.5 part sulfuric acid in 40 parts water The procedure of Example 1 is followed with a 20 minute reflux time and a total heating time of 165 minutes. The resin obtained is very hard and tan in color.

*Example 3*

220 parts (2.0 mols) hydroquinone
19 parts (0.2 mol) phenol
324 parts (4.0 mols) formaldehyde, 37% aqueous
0.5 part sulfuric acid in 40 parts water All of the above ingredients save the sulfuric acid are placed in a vessel equipped as in Example 1, and nitrogen is bubbled into and through the contents of the vessel with agitation until all air is displaced. The sulfuric acid catalyst is then added and heating is begun while continuing the flow of nitrogen to maintain a nitrogen atmosphere. The procedure of Example 1 is then followed, the reflux time being 12 minutes and that of total heating, 40 minutes, and the resin being cured at 90° C. The product is a very hard resin, black on the outside and brown on the inside.

*Example 4*

220 parts (2.0 mols) hydroquinone
19 parts (0.2 mol) phenol
324 parts (4.0 mols) formaldehyde, 37% aqueous
0.5 part sulfuric acid in 40 parts water The procedure of Example 1 is followed except that the product is air-dried at 25° C. for about 16 hours instead of in an oven.

Our preferred resins are essentially hydroquinone-formaldehyde condensation product cross-linked and insolubilized by phenol. The foregoing examples set forth the preferred molar ratio of 20:10:1, formaldehyde to hydroquinone to phenol, but the present invention is in no sense limited to these proportions. In general we may prepare insoluble resins capable of undergoing reversible oxidation and reduction reactions in which the molar ratio of hydroquinone to phenol is from about 20:1 to 5:1 and that of formaldehyde to hydroquinone, from about 1.1:1 to 4:1.

The phenol may be replaced, in part or completely, by its homologs containing no ortho or para substituents, i. e., m-cresol, 1,3,5-xylenol, other alkylated phenols as the m-ethyl phenol, etc., as well as by other crosslinking aldehyde-reactive compounds such as melamine, urea, thiourea, substituted ureas and aminotriazines having a hydrogen atom attached to each anion nitrogen atom, etc.

Similarly, the hydroquinone may be replaced, in part or completely, by other aldehyde-reactive redox compounds such as other polyhydroxy benzenes including catechol, pyrogallol, etc., polyhydroxy naphthalenes, polyhydroxy anthracenes and polyhydroxy phenanthrenes, etc., p-nitrosophenol, p-nitrosoaniline, the indamines, the indophenols, hydrazobenzene, arsenobenzene, etc.

Moreover, other aldehydes including formaldehyde-yielding compounds as paraformaldehyde, hexamethylenetetramine, etc., benzaldehyde, acetaldehyde, paraldehyde, furfural, glyoxal, and the like, may be used to replace all or part of the formaldehye of the examples.

The same relative molar proportions of each of the types of reactants as set forth above in connection with the hydroquinone-phenol-formaldehyde resins apply generally.

Either acids or bases may be used to catalyze the resin-forming condensation of the present invention. Some suitable catalysts are sulfuric acid, hydrochloric acid, phosphoric acid, hydrofluoric acid, trichloroacetic acid, potassium hydroxide, sodium carbonate, triethanolamine, ammonium hydroxide, etc.

The resins may be prepared under normal atmospheric conditions, i. e., in the presence of air, or they may be prepared under an inert atmosphere of carbon dioxide, nitrogen, etc.

The time and temperature of cure of the resins of our invention exert considerable influence on the oxidation-reduction properties of the resins, and over-cure is, in general, to be avoided. Good resins are obtainable by air drying alone or by curing at temperatures of from about 0°–200° C. Long curing periods at the low temperatures, i. e., from about 0°–25° C. are not particularly practical but do no harm. Very short cure times at the high temperatures, i. e., about 150°–200° C., may also be adopted if the conditions are carefully controlled. Excessive heating of the resins results in decreased reducing capacities. We prefer curing at about 20°–150° C. We do not wish to be limited to any particular theory for the mechanism of this effect, but we believe that either the active groups of the resin are irreversibly oxidized during heating or further condensation takes place so that the active groups are rendered less accessible.

It is most convenient to carry out the resin-forming condensation at reflux temperature as in the examples. Temperatures of from about 20°–200° C. may, however, be used.

Moreover, while the resins of specific examples are prepared in aqueous media, they may also be prepared in solution or in dispersion in other media such as alcohols, ethers, hydrocarbons, etc. We prefer the use of water as a reaction medium for obvious practical reasons.

The resin-forming condensation reaction can be arrested in the sol stage, i. e., before gelation, in which case a fusible resin is obtained. Advantage may be taken of the oxidation-reduction properties of this fusible resin, which is soluble in its reaction medium, by applying it in a medium in which it is insoluble. Thus, for example, a fusible, water-soluble resin may be insoluble in an organic medium and may therefore be used in such a medium. When it is intended to prepare a fusible resin, the cross-linking aldehyde-reactive compound, i. e., phenol, may be omitted from the resin formulation, if desired.

Our preferred resins, as prepared, are essentially in the reduced form except for some oxidation, primarily on the surface, which occurs during the resin cure. The resins may be used as prepared but if they are to be used in the reduced form, more efficient operation is obtained by converting them completely to the reduced form. If it is desired to utilize the oxidized form of the resins, they must be of course be oxidized before use.

It is also contemplated, within the scope of our invention, to first prepare an insoluble resin and then introduce an active redox group after resinification. Thus, for example, an insoluble copolymer of styrene and divinyl benzene may be prepared and into it introduced hydroxylamine groups which are reversibly oxidized to nitroso groups or hydrazo groups which are reversibly oxidized to azo groups, and the like.

OXIDATION-REDUCTION OF RESINS

*Example 5*

The reducing capacities of the resins of Examples 1 and 3 and the air-dried resin of Example 4 are conveniently measured by determining the quantity of ceric ion reduced to cerous ion by a known weight of resin in a given length of time. As will be seen from the following table wherein are set forth the reducing capacities of the resins as determined, the rate of reduction is high for the first few hours of contact time with a decrease in the rate of ceric consumption as the contact time increases.

| Resin | Contact Time in hours | Capacity in milliequivalents/gram |
|---|---|---|
| Example 1 | 2 | .73 |
| Do | 3 | .91 |
| Do | 4 | .90 |
| Do | 5 | 1.24 |
| Do | 22 | 2.07 |
| Do | 72 | 3.50 |
| Example 3 | 2.2 | .63 |
| Do | 24 | 2.01 |
| Example 4 | 2 | 1.77 |

The capacities are determined by placing a weighed amount (approximately 1 gram) of −20+40 mesh or −40+60 mesh resin in the reduced form in a suitable vessel and adding a known volume (approximately 40 cc.) of 0.1 N ceric sulfate solution. The vessel is stoppered and its contents allowed to stand for the desired contact times after which the resin is filtered off, washed and the combined filtrate and washings titrated with 0.1 N ferrous sulfate solution to a pink endpoint with a commercial solution 0.075 M in o-phenanthroline and 0.025 M in ferrous sulfate. The quantity of ferrous sulfate required is a measure of the ceric ion in the reduced solution. This is subtracted from the ceric ion originally present and the difference, which is the quantity of ceric ion reduced, expressed in milliequivalents, divided by the weight of the resin, expressed in grams, gives the reducing capacity.

In order to be suitable for oxidation-reduction reactions, our new resins should fall within a particle size range of from about −10 to +200 mesh, screened dry or wet on a U. S. Standard screen, the smallness of the resin particles being limited only by the manipulative difficulty of passing liquids through, and removing them from, very small particles which tend to pack and the largeness of the resin particles being limited by the decrease in reduction capacity as the total surface area decreases.

The reducing capacity is, in general, greater in a given time for a given weight of resin of smaller particle size.

| Resin | Particle Size | Contact Time in hours | Capacity in me./g. |
|---|---|---|---|
| Example 3 | −20+40 | 2½ | 0.63 |
| Do | −40+60 | 2½ | 0.89 |
| Do | −20+40 | 24 | 2.01 |
| Do | −40+60 | 24 | 2.51 |

The oxidation-reduction cycle of our new resins is reversible as will be evident from the measurements on the resins of Examples 1, 2 and 4 which are set forth below. The reducing capacities of the −20+40 mesh resins for ceric ions are determined as above, the resins are then themselves reduced by heating with sodium hydrosulfite solution, and the reducing capacities again determined.

| Resin | First Cycle | | Second Cycle | | Third Cycle | |
|---|---|---|---|---|---|---|
| | Contact Time, hrs. | Capacity, me./g. | Contact Time, hrs. | Capacity, me./g. | Contact Time, hrs. | Capacity, me./g. |
| Example 1 | 2 | 0.73 | 2 | 0.67 | 2 | 0.67 |
| Do | | | 2 | 0.73 | 2 | 0.67 |
| Example 2 | | | 2 | 1.11 | 2 | 0.98 |
| Do | 2 | 0.94 | 2 | 0.72 | | |
| Example 4 | 2 | 1.31 | 2 | 1.49 | 2 | 1.56 |

The electrode potential of the resins, which indicates those substances the resins will reduce whereas the capacity tells how much of a particular substance will be reduced by a given weight of resin, is substantially the same as that of hydroquinone itself when measured by a method based on a standard procedure for determining the electrode potential of soluble materials.

The oxidation-reduction resins of the present invention, in addition to their many obvious applications, possess definite antioxidant properties. This is illustrated by the following:

Example 6

A portion of the −40+60 mesh resin of Example 2 is heated with sodium hydrosulfite solution for about ½ hr., washed with water and dried at about 20–30° C. for about 16 hours and at 100° C. for an additional 2 hours.

Weighed portions of the substantially completely reduced resin are placed in two colorless glass vessels, peroxide-free diethyl ether is added, and the mixtures are allowed to stand in the daylight, along with a portion of untreated peroxide-free diethyl ether. The peroxide formation in each case is then determined with the following results:

| Weight Ratio, Resin/Ether | Aged in days | Peroxide Oxygen in Percent |
|---|---|---|
| 0 | 66 | 0.024 |
|   | 77 | 0.013 |
| 0.04% | 66 | 0.0046 |
|   | 77 | 0.0075 |
| 1.4% | 66 | none |
|   | 77 | 0.0011 |

The following method is convenient for determining the extent of peroxide oxygen formation. To a 5 cc. sample of the ether are added 5 cc. of acetic anhydride and then about 1 g. of potassium iodide. After agitation followed by 15 mins. standing, water is added and formation of a yellow to brown color is taken as an indication of the presence of peroxide. This may be determined quantitatively by adding about 5 cc. of starch solution and titrating to a colorless endpoint with 0.01 N sodium thiosulfate solution.

STABILIZED COMPOSITIONS

Example 7

Two Pyrex ignition tubes, drawn out to permit rapid sealing, are charged with 5.0 parts of distilled dried vinyl acetate. The second tube is also charged with 0.25 part of a hydroquinone-formaldehyde-phenol resin used as prepared according to Example 4 and therefore in its reduced form. The tubes are simultaneously evacuated for 15 min. at 2–3 mm. pressure while chilled in Dry Ice. While still under vacuum the tubes are sealed; the tubes are then subjected to irradiation with ultraviolet light for several hours each day. After 14.5 hrs. of irradiation, over a period of 96 hours, the contents of the tube with no resin are solid, while the contents of the second tube with the resin are still fluid.

Example 8

Two tubes are charged with 5.0 part portions of distilled ethyl acrylate, and 0.25 part of a hydroquinone-formaldehyde-phenol resin prepared according to Example 2 and in the reduced form is added to the second tube. The tubes are chilled with Dry Ice, simultaneously evacuated at 2–3 mm. for 20 min., and sealed off while under vacuum. The tubes are heated for 195 hours at 62° C. No change is apparent. The tubes are then heated at 100° C. for 24 hours. The contents of the first tube with no resin are very viscous after 24 hours of heating, and nearly solid after 46 hours of heating. The contents of the second tube with resin are completely fluid after 97 hours of heating.

Example 9

Two tubes are charged with 5.0 part portions of distilled dried ethyl methacrylate, and 0.25 part of hydroquinone-formaldehyde-phenol resin prepared according to Example 2 and in the reduced form is added to the second tube. The tubes are chilled, evacuated, sealed off, and irradiated intermittently with ultraviolet light, as in Example 7. After 2½ hours of irradiation over a period of 65 hours the contents of the first tube with no resin are very viscous, while the contents of the second tube are only slightly viscous. After 3½ hours of irradiation over a period of 161 hours the contents of the first tube are solid, while those of the second tube with resin are still mobile, though viscous.

Example 10

Inhibitor-free styrene is purified by steam distillation from admixture with an equal volume of 2% aqueous sodium hydroxide. The styrene layer of the distillate is dried with anhydrous sodium sulfate at about 0° C. and filtered before use.

Tubes are charged with 21 parts each of the inhibitor-free styrene. To all but one of the tubes are added varying quantities of resins prepared according to Examples 1 and 2, and all the tubes are stoppered and stored at room temperature (about 20–25° C.) where they receive normal daylight.

In order to test the styrene for the presence of polymer 10 drops of the tube contents are added to 10 ml. of methanol. The presence of polystyrene is evidenced by cloudiness or a white precipitate depending on the quantity present.

The following results are observed:

| Resin | | Methanol Test | |
|---|---|---|---|
| Type | Quantity, Percent on Styrene | Age in days | Reaction |
| Ex. 2 | 10 | 4 | cloudiness. |
|  |  | 7 | precipitate. |
|  |  | 39 | sl. cloudiness. |
|  |  | 108 | Do. |
| Ex. 1 | 5 | 21 | Do. |
|  |  | 104 | Do. |
| Do | 1 | 21 | Do. |
| Do | 0.5 | 7 | Do. |
| Do | 0.1 | 4 | Do. |

Thus it is evident that our new oxidation-reduction resins are useful when in their reduced form as polymerization inhibitors for vinyl-type monomeric compounds. They are effective in amounts from as low as about 0.01% by weight of resin, based on the weight of monomeric compound, with no real upper limit except a practical one, although we generally prefer to use from about 0.1% to 10%. Examples of vinyl-type (containing a $CH_2=C<$ group) monomeric compounds which may be stabilized against polymerization with our new resins are styrene and other vinyl-substituted aromatic hydrocarbons as the o-, m- and p-methyl, ethyl, isopropyl, etc., styrenes, acrylic and alkacrylic, i. e., methacrylic, acids, nitriles, and esters, i. e., methyl, ethyl, butyl, etc., vinyl ethers and esters such as methyl vinyl ether, divinyl ether, vinyl chloride, vinyl acetate, aliphatic hydrocarbons and derivatives thereof such as butadiene, isoprene, chloroprene, the butenes, propene, ethylene, and homologs thereof and the like. Our resins are also effective when used in copolymerizable compositions containing two or more of the vinyl-type monomers as set forth above.

The resins, when in the oxidized form, are effective polymerization catalysts for monomers of the type listed in the preceding paragraph. Moreover, an accelerated catalytic effect on the rate of polymerization of such vinyl-type monomers may be realized by using our new resins in the reduced form in redox combinations as, for example, in conjunction with a peroxide catalyst, i. e., benzoyl peroxide. This effect is similar to that described and claimed by one of us in copending application, Serial No. 763,765 filed July 25, 1947.

Another interesting application of our new resins is the use of a mixture of oxidized resin and reduced resin to keep the oxidation-reduction potential of a medium constant. The mixture thus serves as an electronic buffer.

We do not wish to be limited to any particular theory to account for the oxidation-reduction capacity of our new resins, but we believe that the hydroquinone nuclei in the cross-linked resins undergo a reversible transformation to the quinone nuclei in accordance with the well-known reaction, as follows:

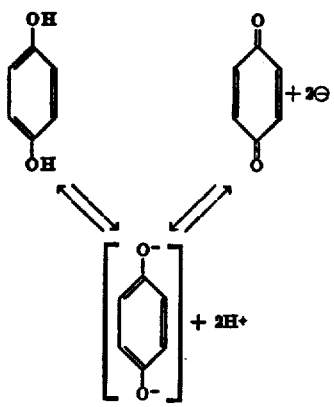

It is a great advantage of the present invention that an insoluble resin has been found which has reversible oxidation-reduction properties. Since our preferred new resins are insoluble in aqueous media and infusible, it is a very simple matter to bring them into contact with an aqueous solution of an ion which it is desired to oxidize or reduce and an equally simple matter to remove the insoluble resin from the solution by mere filtration or decantation after the desired action has been effected.

As demonstrated by Example 6, our new resins are useful as anti-oxidants. They may be employed as stabilizers for photographic solutions. They may also be used to affect physiological activity in various synthetic and naturally occurring drug products by either oxidation or reduction reactions. The new resins may also serve to catalyze biological oxidations or reductions by acting as oxygen or hydrogen carriers. Since the resins are insoluble and infusible they do not contaminate the biological material.

One very important application of our new resins is their use in the reduced form as polymerization inhibitors for vinyl-type monomeric materials. This application is described in Examples 7, 8, 9 and 10.

We claim:

1. A composition of matter which comprises a granular infusible water-insoluble product of the condensation of hydroquinone, a phenol containing no substituents in the positions ortho and para to the hydroxy group, and an aldehyde in which the relative molar proportions of hydroquinone to the phenol are from 20:1 to 5:1 and those of aldehyde to hydroquinone are from 1.1:1 to 4:1 and in which substantially all of the aldehyde is present prior to removing a substantial amount of the water of condensation, the condensation product being reversibly oxidizable and reducible in an aqueous medium.

2. A composition of matter which comprises a granular infusible water-insoluble product of the condensation of hydroquinone, phenol and an aldehyde in which the relative molar proportions of hydroquinone to phenol are from 20:1 to 5:1 and those of aldehyde to hydroquinone are from 1.1:1 to 4:1 and in which substantially all of the aldehyde is present prior to removing a substantial amount of the water of condensation, the condensation product being reversibly oxidizable and reducible in an aqueous medium.

3. A composition of matter which comprises a granular infusible water-insoluble product of the condensation of hydroquinone, phenol and formaldehyde in relative molar proportions of substantially 10:1:20 in which substantially all of the aldehyde is present prior to removing a substantial amount of the water of condensation, the condensation product being reversibly oxidizable and reducible in an aqueous medium.

4. A composition of matter which comprises styrene as the sole polymerizable compound and an insoluble condensation product according to claim 1.

5. A composition of matter which comprises vinyl acetate as the sole polymerizable compound and an insoluble condensation product according to claim 1.

6. A composition of matter which comprises from 0.01 to 10 parts by weight of an insoluble condensation product according to claim 1 and 100 parts of a compound containing a vinylidene group as the sole type of polymerizable radical.

7. A composition of matter which comprises an insoluble condensation product according to claim 1 and a compound containing a vinylidene group as the sole type of polymerizable radical.

8. A composition of matter which comprises an insoluble condensation product according to claim 3 and a compound containing a vinylidene group as the sole type of polymerizable radical.

9. A composition of matter which comprises an alkyl acrylate as the sole polymerizable compound and an insoluble condensation product according to claim 1.

10. A composition of matter which comprises an alkyl methacrylate as the sole polymerizable compound and an insoluble condensation product according to claim 1.

11. A composition of matter which comprises a compound containing a vinylidene group as the sole type of polymerizable radical and a granular infusible insoluble product of the condensation of an aldehyde-reactive resin-forming cross-linking compound of the group consisting of thioureas, ureas and aminotriazines having a hydrogen atom attached to each nitrogen atom, and phenols free of ortho and para substituents; an organic aldehyde-reactive resin-forming reversibly oxidizable and reducible resin-forming compound of the group consisting of paranitrosophenol, paranitrosoaniline, hydrazobenzene, arsenobenzene, indamines, indophenols, polyhydroxybenzenes, polyhydroxynapthalenes, polyhydroxyanthracenes and polyhydroxyphenanthrenes; and an aldehyde in which the relative molar proportions of said organic compound to cross-linking compound are from 20:1 to 5:1 and those of aldehyde to said organic compound are from 1.1:1 to 4:1 and in which substantially all of the aldehyde is present prior to removing a substantial amount of the water of condensation; the condensation product being reversibly oxidizable and reducible in a medium in which it is insoluble.

References Cited in the file of this patent

UNITED STATES PATENTS

| | | |
|---|---|---|
| 1,889,751 | Kessler | Dec. 6, 1932 |
| 2,325,376 | D'Alelio | July 27, 1943 |
| 2,385,372 | Rhodes | Sept. 25, 1945 |
| 2,453,666 | Kropa | Nov. 9, 1948 |
| 2,524,079 | Rhodes | Oct. 3, 1950 |

FOREIGN PATENTS

| | | |
|---|---|---|
| 598,602 | Great Britain | Feb. 23, 1948 |

UNITED STATES PATENT OFFICE

CERTIFICATE OF CORRECTION

Patent No. 2,703,792                                            March 8, 1955

Edward L. Kropa et al.

It is hereby certified that error appears in the above numbered patent requiring correction and that the said Letters Patent should read as corrected below.

In the heading to the printed specification, line 2, for "REVERSIBLE" read -- REVERSIBLY --; column 2, line 60, for "product" read -- products --; line 76, for "anion" read -- amino --; column 3, line 8, for "formaldehye" read -- formaldehyde --; line 44, before "specific" insert -- the --; line 68, strike out "be", first occurrence.

Signed and sealed this 26th day of April, 1955.

(SEAL)
Attest:
E. J. MURRY
Attesting Officer

ROBERT C. WATSON
Commissioner of Patents